US011700036B2

(12) United States Patent
Osborn et al.

(10) Patent No.: US 11,700,036 B2
(45) Date of Patent: *Jul. 11, 2023

(54) NETWORK-ENABLED SMART APPARATUS AND SYSTEMS AND METHODS FOR ACTIVATING AND PROVISIONING SAME

(71) Applicant: Capital One Services, LLC, McLean, VA (US)

(72) Inventors: Kevin Osborn, Newton Highlands, MA (US); Jeffrey Rule, Chevy Chase, MD (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/560,391

(22) Filed: Dec. 23, 2021

(65) Prior Publication Data

US 2022/0311475 A1    Sep. 29, 2022

Related U.S. Application Data

(63) Continuation of application No. 17/213,943, filed on Mar. 26, 2021, now Pat. No. 11,245,438.

(51) Int. Cl.
*H04B 5/00*    (2006.01)
*H04W 76/10*    (2018.01)
(Continued)

(52) U.S. Cl.
CPC ....... *H04B 5/0031* (2013.01); *H04L 12/2854* (2013.01); *H04W 76/10* (2018.02); *H04W 84/12* (2013.01)

(58) Field of Classification Search
CPC .. H04B 5/0031; H04L 12/2854; H04W 76/10; H04W 84/12
(Continued)

(56) References Cited

U.S. PATENT DOCUMENTS

| 4,683,553 A | 7/1987 | Mollier |
| 4,827,113 A | 5/1989 | Rikuna |

(Continued)

FOREIGN PATENT DOCUMENTS

| CA | 3010336 | 7/2017 |
| CN | 101192295 | 6/2008 |

(Continued)

OTHER PUBLICATIONS

Haykin M. and Warnar, R., "Smart Card Technology: New Methods for Computer Access Control," Computer Science and Technology NIST Special Publication 500-157:1-60 (1988).

(Continued)

*Primary Examiner* — Eugene Yun
(74) *Attorney, Agent, or Firm* — Hunton Andrews Kurth LLP

(57) ABSTRACT

A network-enabled smart apparatus has a data processing system, at least one operational system, wide area and local network communication interfaces, and a memory. The memory has stored therein apparatus identification information, at least one service application, and an activation application. The activation application causes the data processing system to establish an internet connection and create an NFC-enabled web page. The data processing system transmits, to the user device instructions to navigate to the NFC-enabled web page and instructions for the user to tap an NFC-enabled smart card to the user device. The apparatus data processing system reads, via the NFC-enabled web page, NFC information transmitted to the user device by the smart transaction card. The application causes the apparatus to transmit the NFC information to a service administration server, and receive, from the service administration server, a service activation command. The application responsively activates at least one service application.

20 Claims, 11 Drawing Sheets

(51) Int. Cl.
   *H04L 12/28* (2006.01)
   *H04W 84/12* (2009.01)
(58) Field of Classification Search
   USPC .................................................... 455/41.1
   See application file for complete search history.

(56) References Cited

U.S. PATENT DOCUMENTS

| | | |
|---|---|---|
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,592,553 A | 1/1997 | Guski et al. |
| 5,616,901 A | 4/1997 | Crandall |
| 5,666,415 A | 9/1997 | Kaufman |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Doucem et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Mamdani et al. |
| 8,005,426 B2 | 8/2011 | Huomo et al. |
| 8,010,405 B1 | 8/2011 | Bortolin et al. |
| RE42,762 E | 9/2011 | Shin |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |

(56) References Cited

U.S. PATENT DOCUMENTS

| | | |
|---|---|---|
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Vernon et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | De Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | Von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van OS et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B2 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 10,506,642 B2 | 12/2019 | Henrique Minatel et al. |
| 10,949,842 B1 | 3/2021 | Lee et al. |
| 11,245,438 B1 * | 2/2022 | Osborn ................ H04W 76/10 |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |

(56) References Cited

U.S. PATENT DOCUMENTS

| | | |
|---|---|---|
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2010/0330904 A1 | 12/2010 | Stougaard |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadrajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |

(56) References Cited

U.S. PATENT DOCUMENTS

| | | |
|---|---|---|
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0302409 A1 | 10/2015 | Malek |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0172055 A1 | 6/2019 | Hale et al. |
| 2019/0238517 A1 | 8/2019 | D'Agostino et al. |

FOREIGN PATENT DOCUMENTS

| | | |
|---|---|---|
| CN | 103023643 | 4/2013 |
| CN | 103417202 | 12/2013 |
| EP | 1 085 424 | 3/2001 |
| EP | 1 223 565 | 7/2002 |
| EP | 1 265 186 | 12/2002 |
| EP | 1 783 919 | 5/2007 |
| EP | 2 852 070 | 1/2009 |
| EP | 2 139 196 | 12/2009 |
| GB | 2 457 221 | 8/2009 |
| GB | 2 516 861 | 2/2015 |
| GB | 2 551 907 | 1/2018 |
| KR | 101508320 | 4/2015 |
| WO | WO 00/49586 | 8/2000 |
| WO | WO 2006070189 | 7/2006 |
| WO | WO 2008055170 | 5/2008 |
| WO | WO 2009025605 | 2/2009 |
| WO | WO 2010049252 | 5/2010 |
| WO | WO 2011112158 | 9/2011 |
| WO | WO 2012001624 | 1/2012 |
| WO | 1 469 419 | 2/2012 |
| WO | WO 2013039395 | 3/2013 |
| WO | WO 2013155562 | 10/2013 |
| WO | WO 2013192358 | 12/2013 |
| WO | WO 2014043278 | 3/2014 |
| WO | WO 2014170741 | 10/2014 |
| WO | WO 2015179649 | 11/2015 |
| WO | WO 2015183818 | 12/2015 |
| WO | WO 2016097718 | 6/2016 |
| WO | WO 2016160816 | 10/2016 |
| WO | WO 2016168394 | 10/2016 |
| WO | WO 2017042375 | 3/2017 |
| WO | WO 2017042400 | 3/2017 |
| WO | WO 2017157859 | 9/2017 |
| WO | WO 2017208063 | 12/2017 |
| WO | WO 2018063809 | 4/2018 |
| WO | WO 2018137888 | 8/2018 |

OTHER PUBLICATIONS

Lehpamer, Harvey, "Component of the RFID System," RFID Design Principles, 2nd edition pp. 133-201 (2012).

Pourghomi, Pardis et al., "A Proposed NFC Payment Application," International Journal of Advanced Computer Science and Applications, vol. 4, No. 8 (2013).

Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool," [online] 2018-19 [retrieved on Mar. 25, 2019]. Retrieved from Internet URL: https://www.authorize.net/our-features/account-updater/, 5 pages.

Author Unknown, "Visa® Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

(56) References Cited

OTHER PUBLICATIONS

Author Unknown, "Manage the cards that you use with Apple Pay," Apple Support [online] 2019 [retrieved on Mar. 25, 2019]. Retrieved from Internet URL: https://support.apple.com/en-us/HT205583, 5 pages.
Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.
Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.
Author unknown, "NFC Guide: All You Need to Know About Near Field Communication" Square Guide [online] 2018[retrieved on Nov. 13, 2018]. Retrieved from Internet URL: https://squareup.com/guides/nfc, 8 pages.
Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.
Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K, "Goldbug Big Seven open source crypto-messengers to be compared -: or Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song, F., and Yun, A.l, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Berg, Guy, "Fundamentals of EMV" Smart Card Alliance [online] date unknown [retrieved on Mar. 27, 2019]. Retrieved from Internet URL: https://www.securetechalliance.org/resources/media/scap13_preconference/02.pdf, 37 pages.
Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.
Author Unknown, "Multi-Factor Authentication", idaptive [online] 2019 [retrieved on Mar. 25, 2019], Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
van den Breekel, J., et al., "EMV in a nutshell", Technical Report, 2016 [retrieved on Mar. 25, 2019]. Retrieved from Internet URL: https://www.es.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.eom/jargon/a/autofill.htm, 2 pages.
Author Unknown, "Fill out forms automatically", Google Chrome Help [online] 2019 [retrieved on Mar. 25, 2019], Retrieved from Internet URL: https://support.google.com/chrome/answer/142893?co=GENIE.Platform%3DDesktop&hl=en, 3 pages.
Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone" Conference paper (2013) IEEE AFRICON at Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera SLAM", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019], Retrieved from Internet URL: https://www.bankrate.com/banking/banking-app-location-sharing/, 6 pages.
Author unknown: "onetappayment™", [online] Jan. 24, 2019, [retrieved on Mar. 25, 2019]. Retrieved from Internet URL: https://www.payubiz.in/onetap, 4 pages.
Vu et al., (2012). "Distinguishing users with capacitive touch communication" Proceedings of the Annual International Conference on Mobile Computing and Networking, MOBICOM. 10.1145/2348543.2348569.
EMVCo, EMV Card Personalization Specification, version 1.0 (Jun. 2003), 81 pages.
Ullmann et al., (2012). "On-Card" User Authentication for Contactless Smart Cards based on Gesture Recognition, LNI, 223-234, 12 pages.
Faraj et al. (2008). "Investigation of Java Smart Card Technology for Multi-Task Applications" J. of Al-Anbar University for Pure Science, vol. 2: No. 1: 2008, 11 pages.
Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.

\* cited by examiner

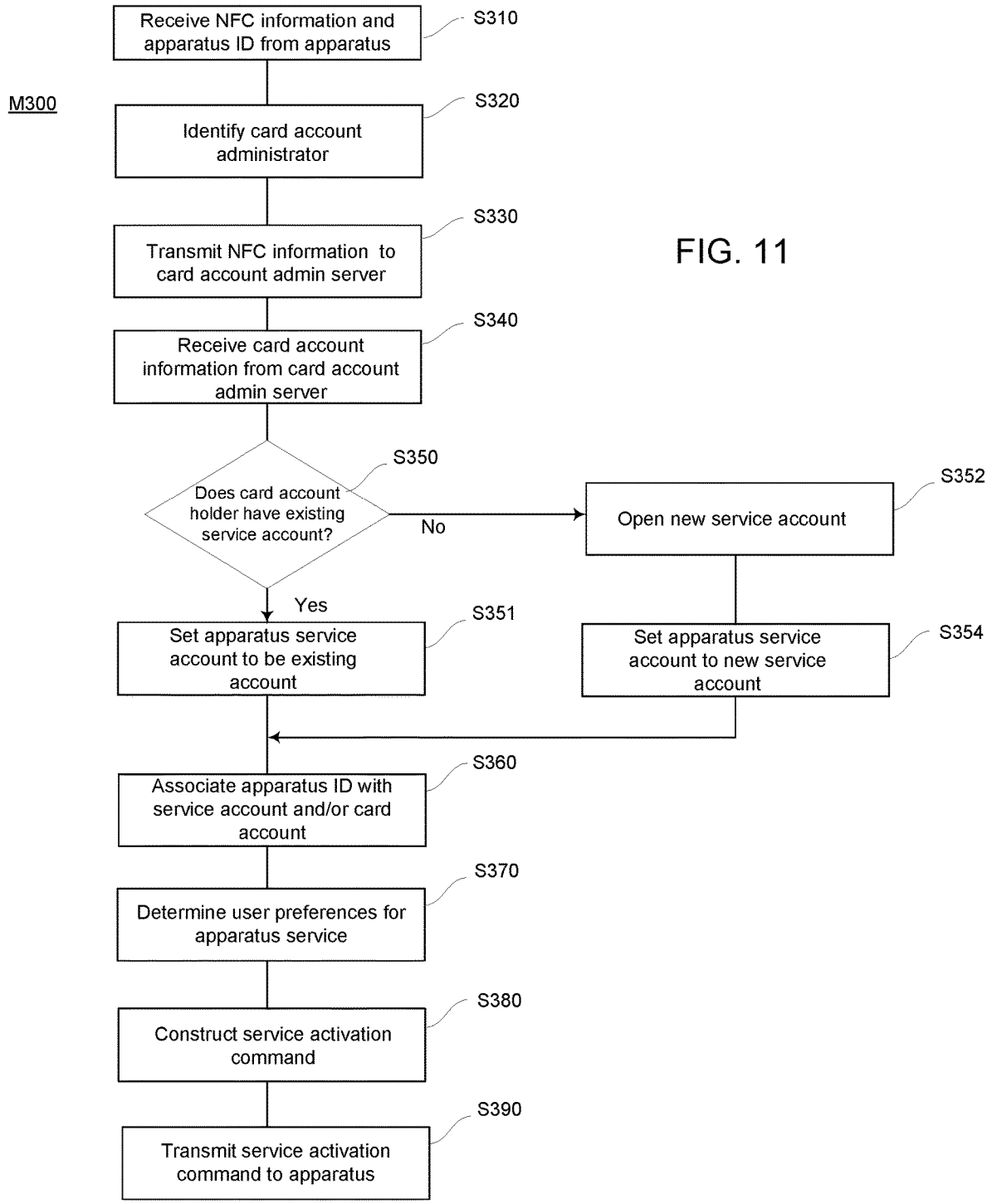

NETWORK-ENABLED SMART APPARATUS AND SYSTEMS AND METHODS FOR ACTIVATING AND PROVISIONING SAME

CROSS REFERENCE TO RELATED APPLICATION

This application is a continuation of U.S. application Ser. No. 17/213,943, filed Mar. 26, 2021, the complete disclosure of which is incorporated herein by reference.

FIELD OF THE INVENTION

This disclosure relates generally to network-enabled appliances and other apparatus, and, more particularly, to systems and methods for activating network-enabled apparatus using web-based near field communication (NFC) protocols.

BACKGROUND OF THE INVENTION

Many home appliances, vehicles, and IT systems now have virtually immediate network connectivity upon installation in the home. Typical activation procedures, however, require the homeowner to connect the new appliance or other apparatus to their home network, then download an installation application to their home computer or mobile device. The application then walks the homeowner through the process of activating and provisioning the new apparatus according to the homeowner's use preferences. Typically, this requires the user to locate and enter identification information for the new device. The application may also require that the homeowner provide account information required for management or use of the device.

SUMMARY OF THE INVENTION

An illustrative aspect of the invention provides network-enabled apparatus comprising an apparatus data processing system, at least one operational system in communication with the apparatus data processing system and configured for carrying out a mechanical or electrical operation, a first network communication interface configured for establishing communication over a wide area network, a second network communication interface configured for establishing communication over a local network, and a memory. The memory has stored therein apparatus identification information, at least one service application comprising instructions for the apparatus data processing system to implement a service operation using the at least one operational system, and an activation application. The activation application comprises instructions for the apparatus data processing system to establish an internet connection via the first network communication interface and create an NFC-enabled web page. The application further comprises instructions to transmit, to a user device via the second communication interface, an instruction to navigate to the NFC-enabled web page and instructions to transmit to the user device via the NFC-enabled web page an instruction for a user of the user device to tap an NFC-enabled smart transaction card to the user device. The activation application also comprises instructions to read, via the NFC-enabled web page, NFC information transmitted to the user device by the smart transaction card. The NFC information includes card identification information unique to the smart transaction card. The activation application still further comprises instructions to transmit the NFC information and the apparatus identification information to a service administration server, and receive, from the service administration server, a service activation command. Responsive to the service activation command, the application will cause activation of at least one of the at least one service application.

Another aspect of the invention provides a method for activating a network-enabled apparatus using an NFC-enabled user device and an NFC-enabled smart transaction card associated with a card account. The method comprises establishing an internet connection by the network-enabled apparatus, creating an NFC-enabled web page by the network-enabled apparatus, and transmitting, by the network-enabled apparatus to the user device, an instruction to navigate to the NFC-enabled web page. The method further comprises transmitting, by the network-enabled apparatus to the user device via the NFC-enabled web page, an instruction for the user to tap the smart transaction card to the user device, and reading, by the network-enabled apparatus via the NFC-enabled web page, NFC information transmitted to the user device by the smart transaction card. The NFC information includes card identification information unique to the smart transaction card. The method still further comprises transmitting, by the network-enabled apparatus to a service administration server of a service administrator, the NFC information and apparatus identification information, identifying, by the service administration server using the apparatus identification information, the network-enabled apparatus, and transmitting the NFC information by the service administration server to a card administration server. The method also comprises receiving, by the service administration server from the card administration server, card account information associated with the card account, identifying an account holder by the service administration server using the card account information, and associating, by the service administration server, the network-enabled apparatus with the card account and an apparatus service account with the service administrator. The method further comprises transmitting, by the service administration server to the network-enabled apparatus, a service activation command.

Another aspect of the invention provides a method for activating a network-enabled apparatus using an NFC-enabled user device and an NFC-enabled smart transaction card associated with a card account. The method comprises establishing communication between the network-enabled apparatus and the user device, creating an NFC-enabled web page by the network-enabled apparatus, and navigating to the NFC-enabled webpage by a web browser on the user device. The method further comprises establishing NFC communication between the smart transaction card and the user device and reading, by the network-enabled apparatus via the NFC-enabled web page, NFC information transmitted to the user device by the smart transaction card. The NFC information includes card identification information unique to the smart transaction card. The method still further comprises transmitting, by the network-enabled apparatus to a service administration server, the NFC information and apparatus identification information and transmitting the NFC information by the service administration server to a card administration server. The method also comprises identifying, by the card administration server using the NFC information, a card account associated with the smart transaction card and transmitting, by the card administration server to the service administration server, card account information associated with the card account. The method yet further comprises identifying an account holder by the service administration server using the card account information, associating, by the service administration server, the network-enabled apparatus with the card account and an apparatus service account with the service administrator, and transmitting, by the service administration server to the network-enabled apparatus from the service administration server, a service activation command.

BRIEF DESCRIPTION OF THE DRAWINGS

The invention can be more fully understood by reading the following detailed description together with the accompanying drawings, in which like reference indicators are used to designate like elements, and in which:

FIG. 11 is a flow chart of a method of activating a smart apparatus according to an embodiment of the invention.

DETAILED DESCRIPTION OF THE INVENTION

Figure 1:
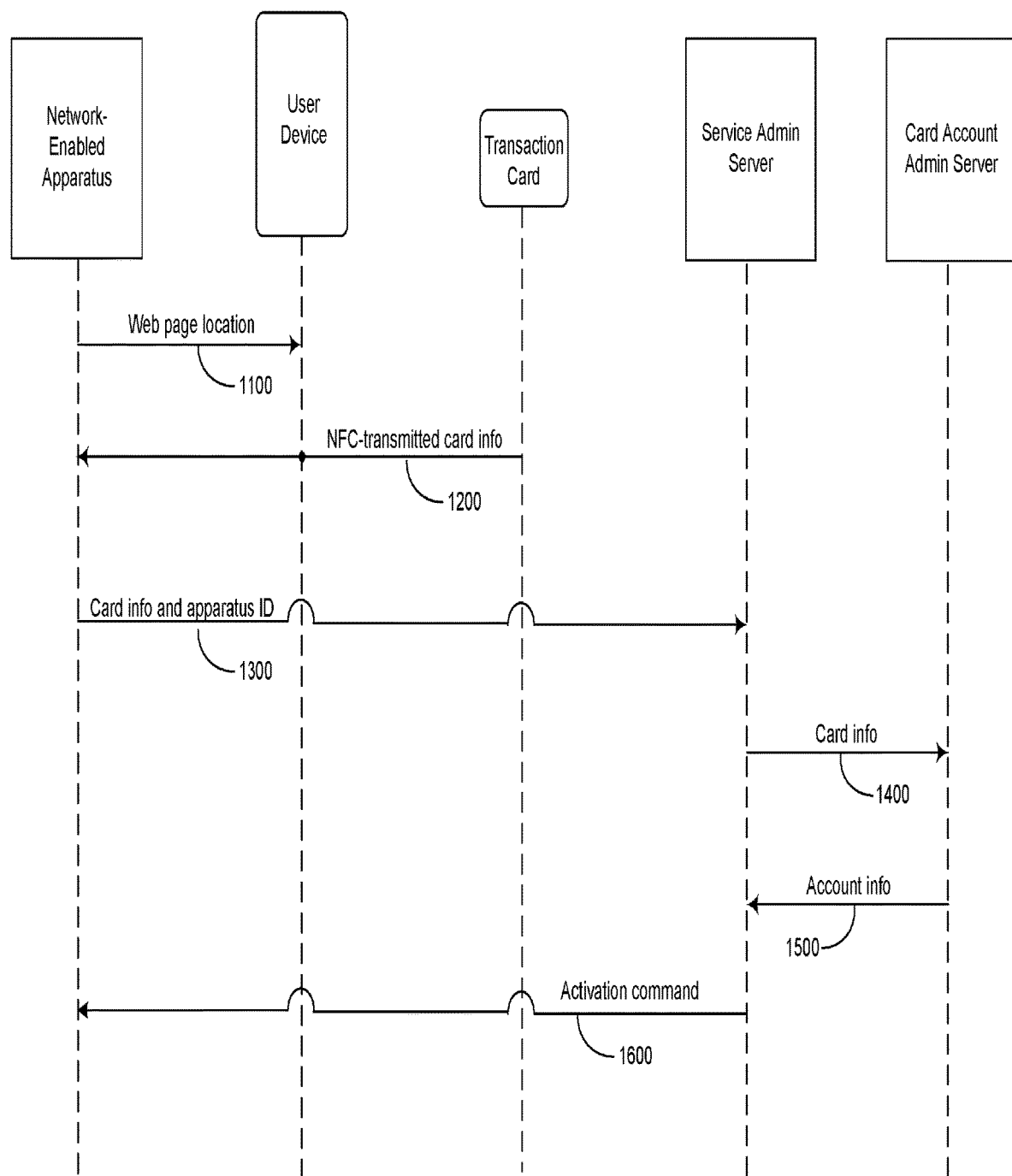
FIG. 1 is a sequence diagram illustrating an operational scenario of an embodiment of the invention.

While the invention will be described in connection with particular embodiments and manufacturing environments, it will be understood that the invention is not limited to these embodiments and environments. On the contrary, it is contemplated that various alternatives, modifications and equivalents are included within the spirit and scope of the invention as described.

The present invention provides systems and methods for activating and provisioning various network-connected smart appliances and other apparatus. As homes become integrated via the "Internet of things", homeowners are finding that every time they purchase a new appliance, they must go through an elaborate process to add the appliance to their home network, establish service, and configure the appliance to fit their needs. This process may be required for any uniquely identifiable smart appliance or device (i.e. any device having a network-enabled processing system). In a typical prior art scenario, a user purchases a device such as a Wi-Fi router for use in conjunction with an Internet service provider (ISP). The user must establish an account with the ISP and then may be asked to download an application for use in initializing the router and establishing Internet service. The app may require the user to log on to the user's account, then scan a barcode on the bottom of the router. The ISP then associates the router with the user account and steps the user through a series of queries that can be used to establish service and configure the router.

In the methods of the present invention, the appliance or other apparatus may be provided with the capability of establishing its own web page which can be used to obtain information from an NFC-capable transaction card via the user's mobile or other device. This can be accomplished without the need for an application on the mobile device with API calls configured for reading and interpreting the NFC information from the transaction card. The transaction card information may be read directly by the smart device and then passed to the ISP or other service provider, which may use the card information to identify the user and establish service. This provides for enhanced efficiency and security of the service initialization process as well as simplifying the process for the user.

NFC works using magnetic induction. The powered NFC reader creates a magnetic field in which a transmitter (typically unpowered) may be immersed. Immersion in the magnetic field produces a current within the transmitter that can be used to power transmission of data to the receiver. NFC capability may be incorporated into transaction processing devices (e.g., merchant check-out devices) or into mobile and other user devices. The NFC transmitter may be a passive tag or, as will be discussed in more detail below, may be incorporated into a smart transaction card.

While NFC capability may be built into a user device, the ability to interpret NFC-transmitted information from a tag or other transmitter requires the use of an application on-board the user device. For example, if a mobile device is to read and interpret a tag's unique identifier, the user must open the application before establishing NFC communication with the tag. The tag may then be brought into NFC range of the user device, whereupon the device reads and interprets the tag's identifier. Absent the application, the NFC information can be "read" but the information is unusable.

To avoid the need for an NFC application to be loaded on the user device, embodiments of the invention make use of browser-based NFC (referred to herein as "Web NFC"). Web NFC is a simplified API for using NFC via web page JavaScript. Web NFC uses a high level approach instead of a powerful low level API that requires special privileges. In short, Web NFC allows the reading of NFC tags through a browser on the user device. This means that no additional application needs to be downloaded to the user device. The NFC-transmitted information is simply passed through the user device to the server or apparatus operating through the web page.

As will be discussed in more detail below, the methods of the invention may be used in conjunction with a typical home network and appliance control system having one or more network-enabled smart apparatus connected to a user device via a local network. (See FIG. 2.) The user device and the smart apparatus may also be connected to a wide area network that allows communication between these devices and an ISP and/or one or more other service providers associated with the operation of the smart apparatus. (See FIG. 5.)

An exemplary scenario for a method of the invention may follow a sequence of operations for initializing and provisioning a network-enabled smart apparatus as shown in FIG. 1. In this scenario, a user purchases or otherwise obtains a network-enabled smart apparatus, powers it up and connects it to the Internet. The Internet connection may be, for example, via wired or wireless connection to a modem or Wi-Fi server. The smart apparatus then uses the Internet connection to create a web page. In some embodiments, the smart apparatus may instead contact a service administration server and request that a web page be created. Once the web page has been established, the smart apparatus communicates the web page address to the user device at 1100. Communication with the user device may be established by connecting the apparatus to the home network. In some embodiments, however, the apparatus may be configured to operate as a limited range wireless access point (i.e., a "hotspot") to which the user device may connect. Upon receiving the address, the user device browser may navigate to the web page, which provides instructions for the user to bring an NFC-enabled smart card to within communication range of the user device. (This action may be referred to herein as "tapping" the transaction card to the user device.) The action of tapping the transaction card to the user device results in the transmission of NFC information from the transaction card through the user device to the smart apparatus via Web NFC at 1200.

The NFC information may be or include a unique identifier for the transaction card that is associated with a card account of the user. At 1300, the smart apparatus may transmit some or all of the NFC information, including the card identifier, to the service administration server associated with the apparatus or a service to be provided by the apparatus. The apparatus may also transmit its own unique identifier. The service administration server may then use the NFC information to identify the administrator of the account associated with the card. At 1400, the service administration server transmits some or all of the NFC information, including the card identifier, to a server of the card account administrator. The card account administrator uses the NFC information to determine the account associated with the transaction card and transmits, at 1500, account information back to the service administration server. This account information may include information about the account holder that the service administration server can use to determine whether the user has an existing service account with the service administrator or to establish a new service account for the user. The service administration server may then associate the account information with the apparatus and transmit a service activation command to the apparatus at 1600. The service activation command may include default provisioning instructions or provisioning instructions determined based on existing service account preferences. In some embodiments, the service administration server may contact the user to prompt for and receive provisioning preferences.

From the user perspective, the above scenario provides a highly simplified activation/provisioning experience in which the user does no more than connect the apparatus, establish communication between the apparatus and the user device, open the web page identified by the apparatus, and tap the transaction card to the user device.

The systems and methods of the invention will now be discussed in more detail.

Figure 2:
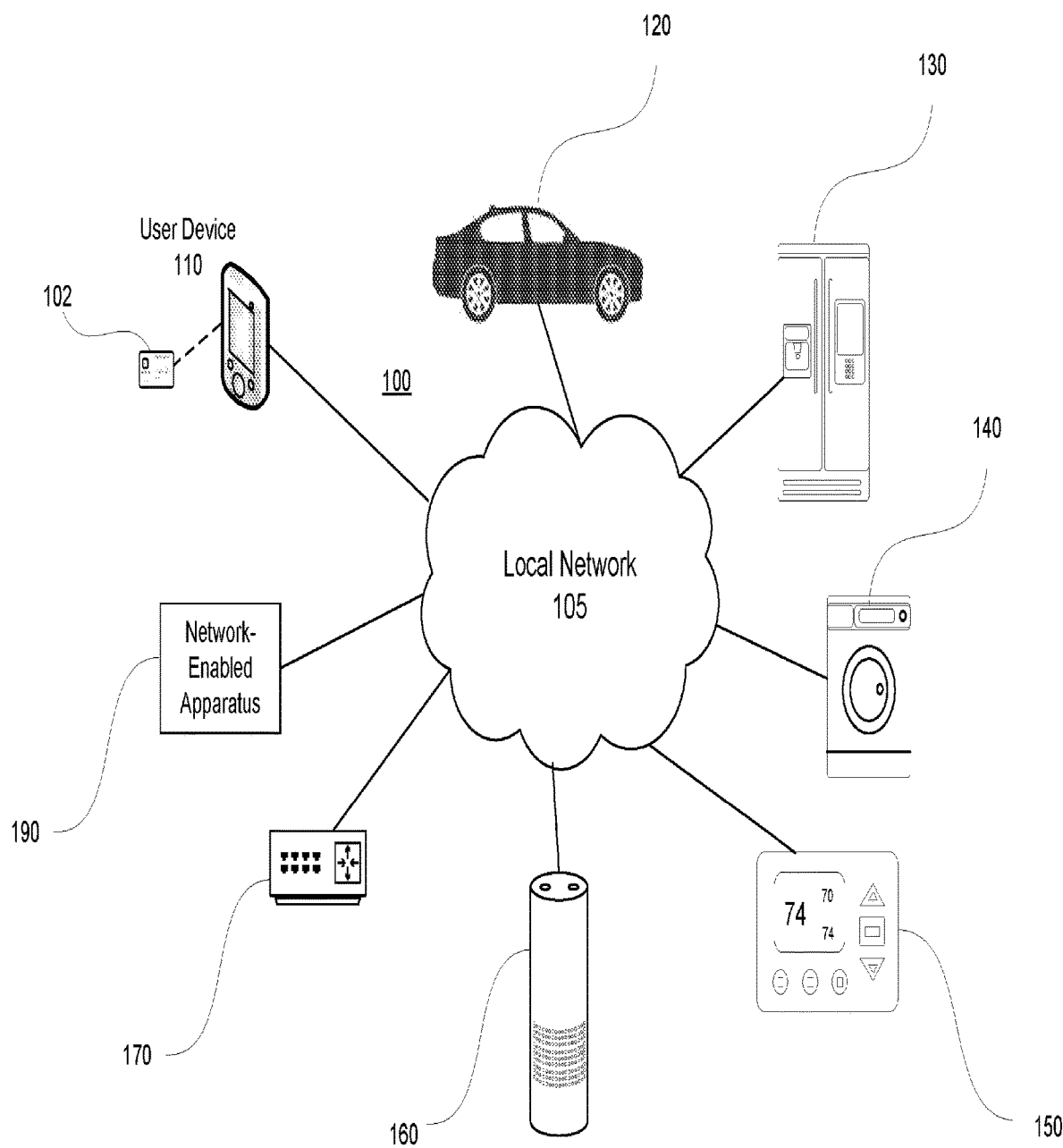
FIG. 2 is a schematic representation of a home network having network-enabled smart apparatus usable in conjunction with methods of the invention.

FIG. 2 depicts a typical home-based smart apparatus control system 100 according to an embodiment of the invention that is usable in conjunction with the methods of the invention. The smart apparatus control system 100 comprises a user processing device 110 and one or more smart appliances or other apparatus. As used herein, the term smart apparatus is used to refer to any controllable vehicle, appliance, or other mechanism or system that has a data processing system that can receive control instructions from a user data processing device (such as user device 110) either through direct wired or wireless communication or via a network (such as network 105). In the illustrative example of FIG. 2, the smart apparatus of system 100 includes a vehicle 120, a refrigerator 130, a clothes washer 140, a heating and cooling system 150, a "smart speaker" 160, a Wi-Fi router 170, and a generic network-enabled apparatus 190. Each of these apparatus may be connected to one another via a local network 105 to which the user device 110 is also connected.

Figure 3:
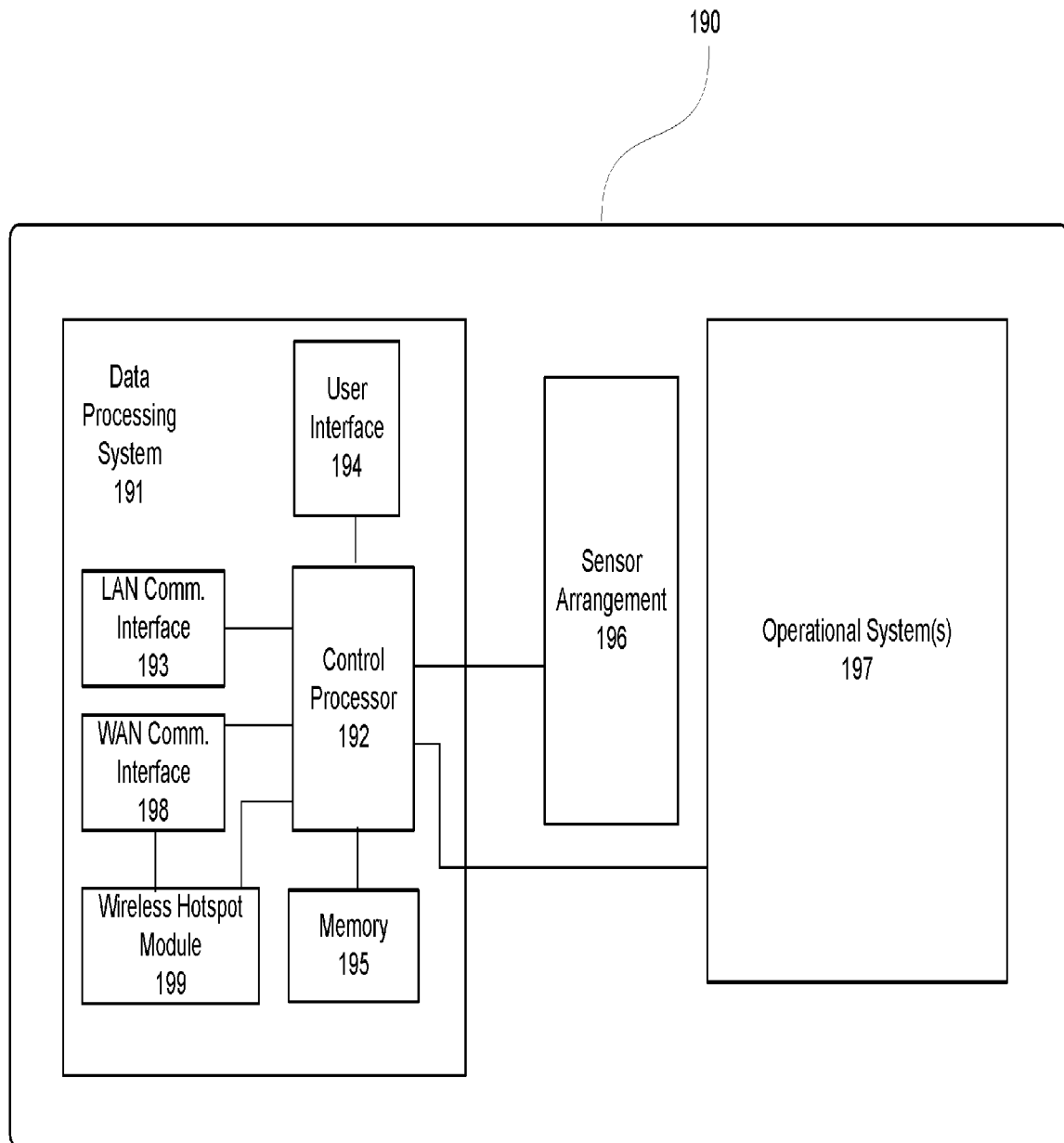
FIG. 3 is a schematic representation of a smart apparatus usable in embodiments of the invention.

With reference to FIGS. 2 and 3, the generic smart apparatus 190 can be used to describe features that may be common to various smart apparatus usable in the systems of the invention. As shown in FIG. 3, the smart apparatus 190 comprises a data processing system 191 and one or more mechanical and/or electrical operational systems 197. The operational system or systems 197 encompass all the operational hardware of the apparatus 190 that allow it to perform its function. In an appliance such as a refrigerator, for example, this would include all of the primary and secondary mechanisms and power supply systems for cooling the enclosed compartments. In a washer, it would include all of the mechanisms for filling, agitating, spinning and draining the wash drum. In a vehicle, it would include a variety of systems for powering, steering, braking, cooling, etc.

The data processing system 191 comprises the elements for communicating with the apparatus 190 and for controlling its operation. These may include a control data processor 192 configured for monitoring and controlling one or more operational parameters of the operational system 197. Such parameters may be as simple as "on or off" or more complex such as the parameters associated with a wash cycle in a washer (e.g., control and timing of water filling and draining, water temperature, agitation cycling, etc.). Operational instructions for the control processor 192 may be stored in a memory module 195. These instructions may be a combination of permanently stored instructions and temporary, user-supplied instructions. In many instances, the memory 195 may have stored therein predetermined operational modes. The memory 195 may also have stored therein operational restrictions that prevent operation of the operational system 197 under predetermined circumstances (e.g., an over-heating condition or excessive current draw). These could require, for example, the control processor 192 to alter the operational mode of the operational system 197 or even shut it down completely.

The memory module 195 may also have stored therein one or more service applications comprising instructions for the apparatus data processing system to implement a service operation. These service applications may include instructions for the control processor 192 to implement operational instructions received from the user or from a service administrator associated with the apparatus 190 or with services provided by or through the apparatus 190. For example, in a case where the apparatus 190 is a router for use in connecting other devices to the Internet, the service administrator could be an ISP and one or more of the service applications may be established and/or controlled by the ISP.

The memory module 195 may have stored therein software for configuring a web page for facilitating initialization of apparatus 190 operation. The web page coding may include Web NFC JavaScript configured for reading transaction card-transmitted NFC information via the browser of a user device.

User input to the data processing system 191 may be received through the use of a user interface 194, which may be or include any device for entering information, control input, and instructions into the system 191. In many cases, the user interface 194 may be a combination of buttons and/or dials having preset control functions. In some apparatus, the user interface 194 may include more complex devices such as a touch-screen, keyboard, mouse, cursor-control device, microphone, stylus, or digital camera.

The data processing system 191 also includes a local area communication interface 193 in communication with the control processor 192 and configured for communication over one or more networks such as the local network 105 of FIG. 2. In particular, the communication interface 193 may be configured to allow the control processor 192 to transmit to and receive transmissions from the user device 110 via the local network 105. In some embodiments, the communication interface 193 may be configured to support short-range wireless communication (e.g., by NFC, radio-frequency identification (RFID), and/or Bluetooth). The data processing system 191 may also include a second communication interface 198 configured for connection to a wide area network (e.g., a telecommunications cable network) such as the network 230 of FIG. 5. The wide area network communication interface may, in particular, be configured to transmit to and receive transmissions from one or more remote servers via a wide area network.

In some embodiments, the data processing system 191 may include a wireless hotspot module 199 in communication with the WAN communication interface 198. The hotspot module 199, in combination with software stored in the memory module 195, is configured for operation as a limited range wireless access point that may be accessed by the user device 110 for communication therewith.

The smart apparatus 190 may include a sensor arrangement 196 in communication with the control processor 192. The sensor arrangement 196 may be configured for monitoring one or more operational parameters of the operational system 197 and/or a measurable parameter of the environment in which the apparatus 190 is operating. In the case of a refrigerator, for example, the sensor arrangement 196 could include temperature sensors for monitoring the temperature in various compartments of refrigerator. In a home heating system, the sensor arrangement 196 could include a room air temperature sensor. The sensor arrangement 196 may also include sensors for monitoring a condition or operating characteristic of the operational system 197. This could include, for example, a sensor for measuring an internal machine temperature that could, if it exceeds a certain level, result in damage to the apparatus. Sensor measurement information is transferred from the sensor arrangement 196 to the control processor 192, which uses it to control operation of the operational system 197.

The memory 195 may also have stored therein an apparatus activation application that may be configured for execution upon the apparatus first being powered up and connected to the Internet. The activation application may include instructions for the control processor 192 to receive, via the local network communication interface 193 or via the wireless hotspot module 199, a service initiation communication from a user device 110. The application may further include instructions to establish Internet communication via the wide area network communication interface 198 and to create a Web NFC-enabled web page. The application may then cause the control processor 192 to transmit to the user device via the local communication interface 193 or the wireless hotspot module 199, a communication that includes the address for the web page and instructs the user to navigate to the web page, which instructs the user to tap an NFC-enabled smart transaction card to the user device. The application then uses the Web NFC methodology to read NFC information transmitted to the user device by the smart transaction card, the NFC information including card identification information unique to the smart transaction card. The application then causes the processor 192 to transmit the NFC information and to a service administration server along with an apparatus identifier stored in the memory 195. The application is configured to receive an activation command back from the service administration server. The service command may include initial operation instructions and/or initial provisioning options for configuring the apparatus for operation. In response, the application may activate apparatus operation and/or one or more service applications.

In some embodiments, the smart apparatus 190 may be a service apparatus configured for facilitating the delivery or monitoring of a utility (e.g., electricity, water, or gas service), a telecommunications link, or data delivery system (e.g., cable or satellite). In such embodiments, the service administrator may be the supplier of the utility, telecommunications service, or data delivery service. For example, if the smart apparatus is or is part of an electrical distribution system, the service administrator would be the power company supplying the electricity.

Figure 4:
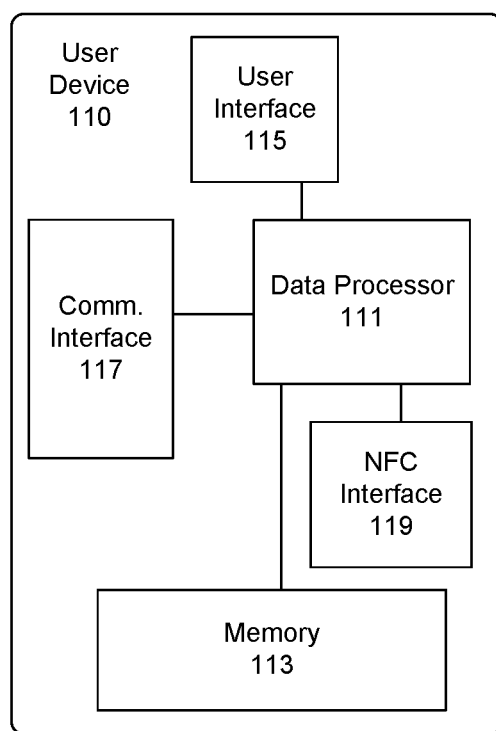
FIG. 4 is a schematic representation of a user processing device usable in conjunction with methods of the invention.

With reference to FIGS. 2 and 4, the account holder/user interface device 110 may be any data processing and/or communication device that an account holder uses to carry out a transaction and/or to receive notifications regarding an account including, but not limited to a smartphone, a laptop, a desktop computer, and a tablet. In particular embodiments, the account holder device 110 includes an on-board data processor 111 in communication with a memory module 113, a user interface 115, and a communication interface 117. The data processor 111 can include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 113 can be a read-only memory, write-once read-multiple memory or read/write memory, e.g., RAM, ROM and EEPROM, and the user device 110 can include one or more of these memories.

The user interface 115 includes a user input mechanism, which can be any device for entering information and instructions into the account holder device 110, such as a touch-screen, keyboard, mouse, cursor-control device, microphone, stylus, or digital camera. The user interface 115 may also include a display, which can be any type of device for presenting visual information such as a computer monitor, a flat panel display, and a mobile device screen, including liquid crystal displays, light-emitting diode displays, plasma panels, and cathode ray tube displays.

The communication interface 117 is configured to establish and support wired or wireless data communication capability for connecting the device 110 to a broad network (e.g., network 230 of FIG. 5), the local network 105, or other communication network. The communication interface 117 can also be configured to support communication with a short-range wireless communication interface, such as radio-frequency identification and Bluetooth. In particular, the communication interface 117 may be configured to detect and establish communication with the smart apparatus data processing system 191 via the wireless hotspot module 199.

The user device 110 may further include an NFC interface 119 that includes an NFC receiver configured for selectively activating a magnetic field for use in establishing near field communication with an NFC transmitter. The NFC interface 119 is configured for establishing NFC communication when a passive NFC tag or other NFC-enabled device is brought into the magnetic field and within NFC communication range of the user device 110. The NFC interface 119 is configured, in particular, for communication with an NFC-enabled smart transaction card 102 when the card 102 is tapped to the user device 110.

In embodiments of the invention, the memory 113 may have stored therein one or more applications usable by the data processor 111 to conduct and/or monitor transactions on a transaction account between the account holder device 110 and a merchant device or other device. These applications may include instructions usable by the data processor 111 to identify transaction events, store event data in the memory 113, and communicate event data to a transaction processing server and/or an account management server. Some applications may also include instructions relating to receiving and interpreting notifications and/or instructions from the transaction processor or account administration server (e.g., card account administration server 260 of FIG. 5).

In particular embodiments, the memory 113 may have stored therein a financial monitoring application configured for receiving account information from an account management server. The account information may include information on any account parameter including, but not limited to, a current account balance, average account balance, project account balance, expenditures over a time interval or since a beginning date of a time interval (e.g., the first day of the month). The account information may also include information such as a previous account balance, information on recent transactions, information on projected or scheduled transactions (e.g., automatic deposits or withdrawals), and payments to particular merchants.

The user device memory 113 may also have stored therein a smart apparatus control application configured with instructions for the data processor 111 to construct and transmit control instructions to one or more of the smart apparatus 120, 130, 140, 150, 160, 170, 190 via the local network 105. The application may be configured to tailor these instructions according to information stored in the memory 113 for the apparatus being controlled. The instructions associated with a generic apparatus 190 may include instructions for displaying prompts to the account holder for and receiving from the account holder via the user interface 115 control input information for the apparatus 190. The control input information may include an operation mode selection, specification of one or more operational parameters, and/or one or more desired apparatus output parameter. The control application may be configured to instruct the data processor to receive the control input information and construct apparatus control instructions and transmit them to the data processing system 191 of the apparatus 190 via the local network 105. The apparatus control instructions may include an instruction to set or change an operational parameter of the apparatus 190.

The control application may be further configured with instructions for receiving operation information from the data processing system 191 of the apparatus 190. The application may be configured to review this information and determine whether to display some or all of the information to the account holder via the user interface 115. In some embodiments, the control application may be configured to prompt for and receive additional control input information in response to the operation information received from the apparatus 190.

The user device memory 113 may also have stored therein an apparatus operation monitoring application having instructions configured for receiving information on the operation of an apparatus to determine if automated changes to its operation may be having a negative or unintended effect on the apparatus. This may include instructions to receive and evaluate operation information from any or all of the apparatus 120, 130, 140, 150, 160, 170, 190. Such operation information may include information on one or more measured operational parameters for the apparatus and/or measured environment parameters.

In some embodiments, the control application may include instructions for the data processor 111 to use financial parameter information and operational parameter information along with empirical life expectancy and/or cost information for an apparatus 190 to determine an optimized set of operational parameters for that apparatus 190. The optimized set of operational parameters can then be included in change control instructions transmitted by the data processor 111 to the control processor 192 of the apparatus 190.

Figure 5:
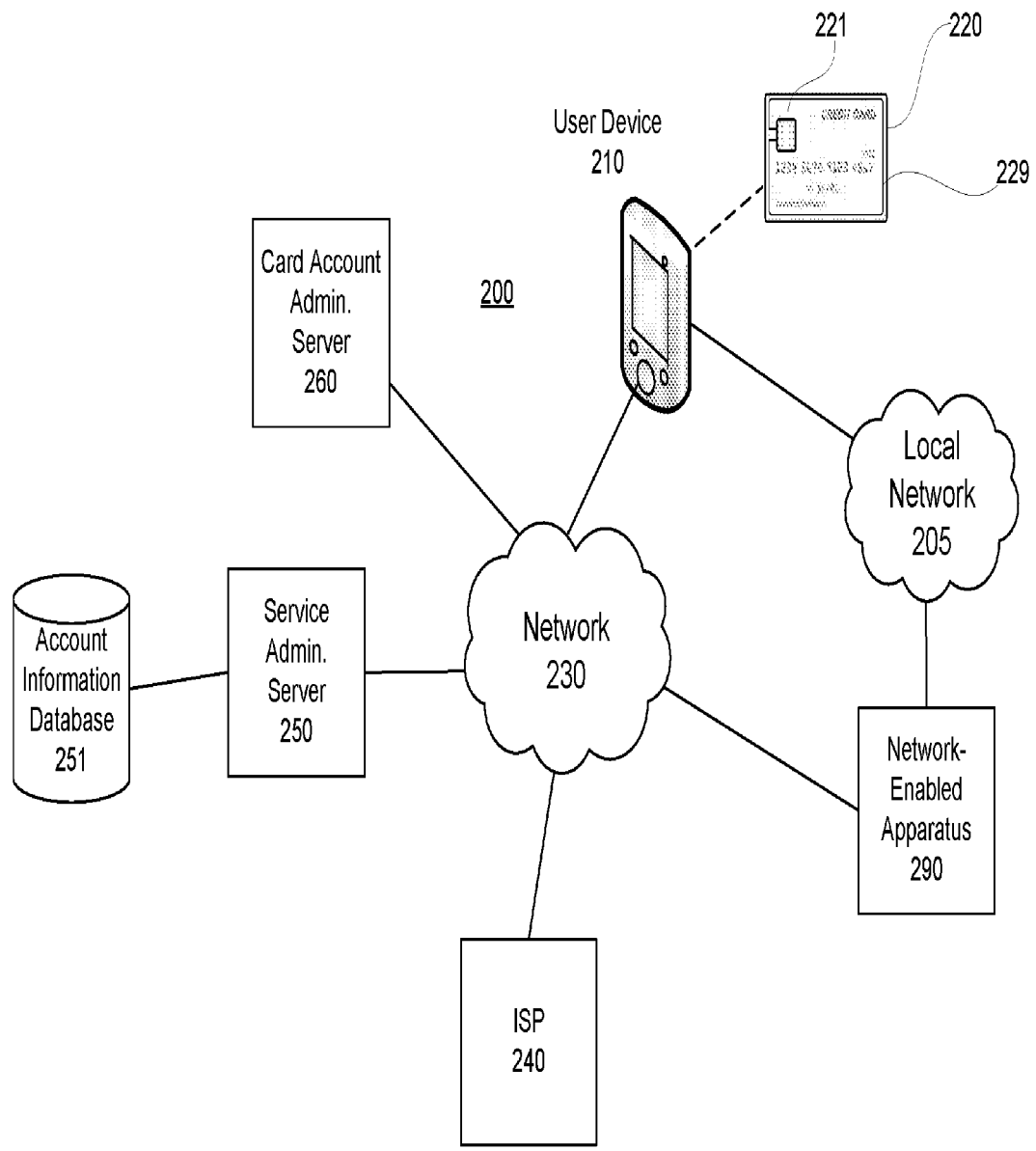
FIG. 5 is a schematic representation of a network-based system for activating a network-enabled smart apparatus according to an embodiment of the invention.

With reference now to FIG. 5, a system 200 for activating a network-enabled smart apparatus 290 according to an embodiment of the invention may include a user device 210, which may be in selective communication with the smart apparatus 290 via a local network 205. The user device 210 and local network 205 may be similar to those previously described in relation to the apparatus control system 100. The system 200 may also include an Internet service provider 240, an apparatus service administration server 250, and a card account administration server 260, all of which may be in contact with one another or with the user device 210 and/or the smart apparatus 290 via a wide area network 230.

The various components of the system 200 may include various network-enabled computer systems configured for processing information and transactions involving a plurality of service accounts administered by an apparatus service administrator and/or a plurality of transaction card accounts administered by a financial institution, merchant or other card account administrator. As referred to herein, a network-enabled computer system and/or device may include, but is not limited to any computer device, or communications device including, a server, a microprocessor or system of microprocessors, a network appliance, a personal computer (PC), a workstation, and a mobile processing device such as a smart phone, smart pad, handheld PC, or personal digital assistant (PDA). In some examples, the computer device may use instructions stored on a computer-accessible medium (e.g., a storage device such as a hard disk, floppy disk, memory stick, CD-ROM, RAM, ROM, etc., or a collection thereof). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein.

The network-enabled computer systems used to carry out the actions contemplated by the invention may execute one or more software applications to, for example, receive data as input from an entity accessing the network-enabled computer system, process received data, transmit data over a network, and receive data over a network. The one or more network-enabled computer systems may also include one or more software applications to notify an account holder based on transaction information.

It will be understood that the depiction in FIG. 5 is an example only, and the functions and processes described herein may be performed by any number of network-enabled computers. It will also be understood that where the illustrated system 200 may have only a single instance of certain components, multiple instances of these components may be used. The system 200 may also include other devices not depicted in FIG. 5.

The network 230 may be any form of communication network capable of enabling communication between the subsystems of the system 200. For example, the network 230 may be one or more of a wireless network, a wired network or any combination of wireless network and wired network. The network 230 may be or include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal. The network 230 may utilize one or more protocols of one or more network elements to which it is communicatively coupled. The network 230 may translate to or from other protocols to one or more protocols of network devices. Although the network 230 is depicted as a single network, it will be appreciated that it may comprise a plurality of interconnected networks, such as, for example, the Internet, a service provider's network, a cable television network, corporate networks, and home networks.

In the example embodiments presented herein, an account holder may be any individual or entity permitted to conduct a transaction (which may be, but is not limited to a financial transaction) using a transaction card account. An account may be held by any place, location, object, entity, or other mechanism for holding money or performing transactions in any form, including, without limitation, electronic form. An account may be, for example, a credit card account, a prepaid card account, stored value card account, debit card account, check card account, payroll card account, gift card account, prepaid credit card account, charge card account, checking account, rewards account, line of credit account, credit account, mobile device account, or mobile commerce account. An account holder may be a transaction processing entity such as a financial institution, credit card provider, or other entity that offers accounts to customers.

A transaction account may be associated with one or more smart transaction cards 220 (e.g., debit cards, credit cards, or prepaid account cards). Alternatively or in addition, the transaction account may be associated with one or more account holder processing devices or simply associated with a unique identifier enterable by an account holder to facilitate a transaction. The processing devices may be configured to act as a method of payment at a POS location using, for example, NFC or any other mobile payment technology. In some embodiments, separate cards or user devices may be associated with individual account co-holders.

Figure 6:
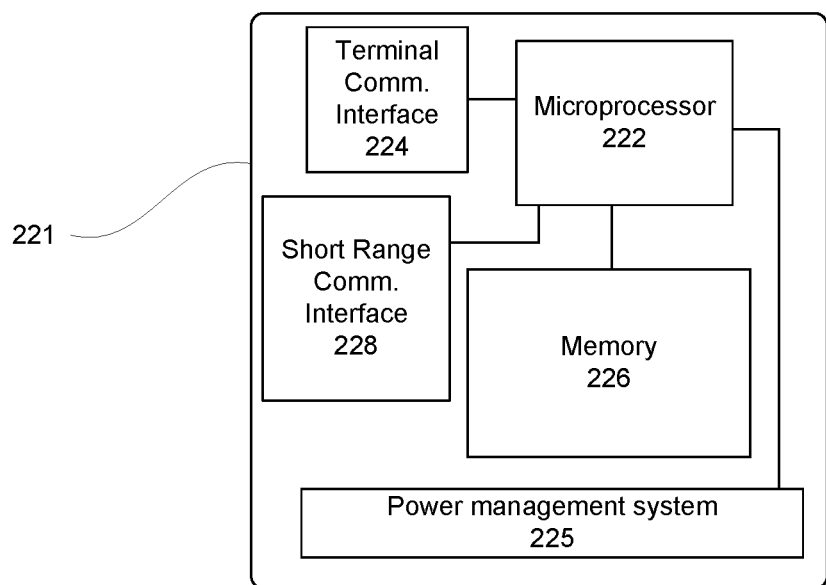
FIG. 6 is a schematic representation of a microprocessor chip of a transaction card usable in embodiments of the invention.

The transaction card 220 may be any chip-carrying transaction card ("smart" card) having electrical and/or near field or other short range communication capabilities. As illustrated in FIGS. 5 and 6, a typical transaction card 220 that is usable in various embodiments of the invention is a smart card with a microprocessor chip 221. The microprocessor chip 221 includes processing circuitry for storing and processing information, including a microprocessor 222 and a memory 226. It will be understood that the processing circuitry may contain additional components, including processors, memories, error and parity/CRC checkers, data encoders, anticollision algorithms, controllers, command decoders, security primitives and tamper-proofing hardware, as necessary to perform the functions described herein.

The transaction card 220 is configured for communication with transaction terminals and other device via a first communication interface 224. The interface 224 and the microprocessor 222 may, in particular, be configured for establishing communication with merchant transaction processing devices for carrying out purchase and other transactions. The communication interface 224 may be configured to provide for contact-based communication, in which case the interface 224 may have electrical circuitry and contact pads on the surface of the card 220 for establishing direct electrical communication between the microprocessor 222 and the processing circuitry of a transaction terminal. Alternatively or in addition, the first communication interface 224 may be configured for contactless communication with a transaction terminal or other wireless device. In such embodiments, the communication interface 224 may be or include an NFC communication interface configured for communication with other NFC communication devices when the card 220 is within a predetermined NFC range. The communication interface 224 and the microprocessor 222 may, in particular, be configured for establishing NFC communication with the user device 210. In some embodiments, the microprocessor chip 221 may include a second communication interface 228 configured for establishing short range communication with the user device 210 via Bluetooth, or other short range communication methodology. In such embodiments, the transaction card 220 may have a short range communication antenna 229 that is included in or connected to the short range communication interface 228. The microprocessor chip 221 may also include a power management system 225 for use in managing the distribution of power during an NFC transaction.

In particular embodiments, the transaction card 220 may be Bluetooth enabled using the microprocessor chip 221, the second communication interface 228 and the antenna 229. A Bluetooth-enabled transaction card may support Bluetooth Low Energy (BLE) and may be paired to the user device 210. In some embodiments, pairing and communications may be established between the transaction card 220 and other interfacing devices, such as a terminal (not shown), a merchant transaction processor 140, and the like. A Bluetooth-enabled device may include the capabilities to establish a link between a card and the device (or pair the devices) using device settings (e.g., iOS or Android settings that manage Bluetooth connections) and/or mobile application(s) associated with the card issuer that can cooperate with the device controls to manage a Bluetooth connection with the card 220.

The memory 226 may be a read-only memory, write-once read-multiple memory or read/write memory, e.g., RAM, ROM, and EEPROM, and the chip 221 may include one or more of these memories. The memory 226 may have stored therein information associated with a transaction card account. In some embodiments, the memory 226 may have permanently stored therein a unique alphanumeric identifier associated with the account. It may also have stored public and private card encryption keys. In some embodiments, the private and public encryption keys may be permanently hard-wired into the card memory.

The memory 226 may be configured to store one or more software applications for execution by the microprocessor 222. In various embodiments, the memory 226 may have stored therein instructions for generating encrypted information and transmitting it to a receiving device (e.g., the user device 210) via the first communication interface 224 (e.g., via NFC) or the short-range communication interface 228. Such encrypted information may be or include an encrypted verification block or signature that may be used to authenticate and verify the presence of the transaction card 220 during transaction processing. In some embodiments, encrypted information be unique to a particular communication (e.g., a particular NFC transmission by the transaction card).

Figure 7:
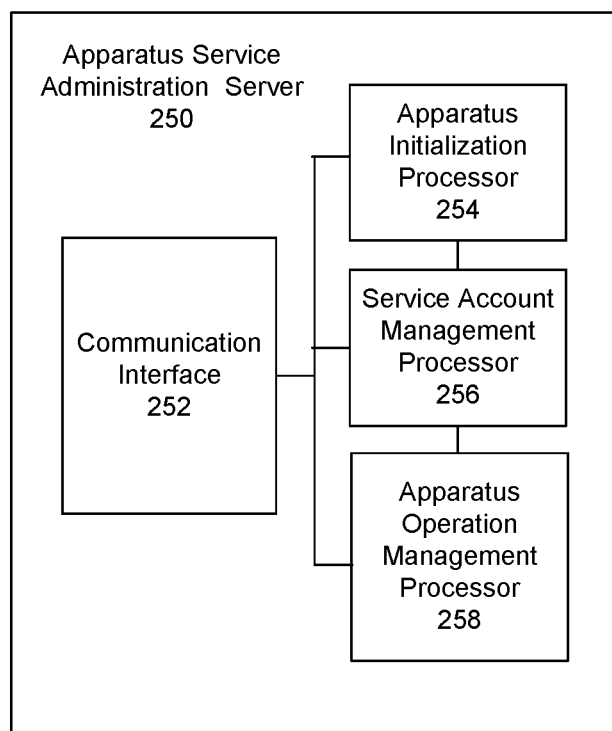
FIG. 7 is a schematic representation of an apparatus service administration server usable in embodiments of the invention.

The apparatus service administration server 250 may be associated with and/or managed by the manufacturer or the seller (or lessor) of the smart apparatus 290. Alternatively, the service administration server 250 may be associated with a provider of a service administered through the apparatus 290. With reference to FIG. 7, the apparatus service administration server 250 may include a communication interface 252 providing a wired and/or wireless connection to the network 230, an apparatus initialization processor 254 and a service account management processor 256. The apparatus initialization processor 254 is configured to receive an initialization request from the apparatus 290, the request including some or all of the NFC information read from the transaction card 220 and identification information for the apparatus 290. The apparatus initialization processor 254 may be further configured to use the NFC information to identify a card account administrator associated with the transaction card 220 and to transmit a card account information request to the card account administration server 260 of the card account administrator. This request may include some or all of the NFC information, including card identification information, some or all of which may be encrypted. The apparatus initialization processor 254 is also configured to receive card account information back from the card account administration server 260. Such information may include identification, contact, and other information relating to the account holder. This information may be forwarded by the initialization processor 254 to the service account management processor 256.

The service account management processor 256 in communication with account information database 251 is configured to receive card account holder information from the apparatus initialization processor 254. The service account management processor 256 may then use the card account holder information to identify the card user and determine whether the user has a service account with the service provider. This may be accomplished by comparing the card account information with account information stored in a service account information database 251. If the user has an account, the processor 256 may associate the apparatus identifier of the apparatus 290 with the existing service account of the user. If the user does not have an existing account, the processor 256 may create a new service account using the card account information for the user. In some embodiments, the service account management processor 256 may contact the user (e.g., via a transmission to the user device 210 over the network 230) to verify that the user wishes to open a new service account or to obtain user preferences in establishing the account and/or operational parameters of the smart apparatus 290. The service account management processor 256 may then associate the smart apparatus 290 with the new account and store the service account information in the account information database 251.

Upon associating the apparatus 290 with either an existing account or a new account, the account management processor 256 may then send the service account information back to the initialization processor 254, which constructs and transmits an initialization command to the smart apparatus 290. This command may include initial provisioning information as well as an instruction to initiate apparatus operation.

In some embodiments, the service administration server 250 may also include an apparatus operation management processor 258, which is configured to communicate with the apparatus 290 for monitoring and management of apparatus operation. In some cases, the operation management processor 258 may communicate with the user regarding the user's operational preferences or instructions. The apparatus operation management processor 258 may also be configured to provide system updates to the data processing system of the smart apparatus 290. In some embodiments, the operation management processor 258 may also be configured to determine time or use-based service fees associated with the use of the apparatus or for services accessed or used via the apparatus. The operation management processor 258 may also be configured to automatically charge some or all of such service fees to the transaction card account associated with the transaction card 220 or to another financial account of the service account holder.

Figure 8:
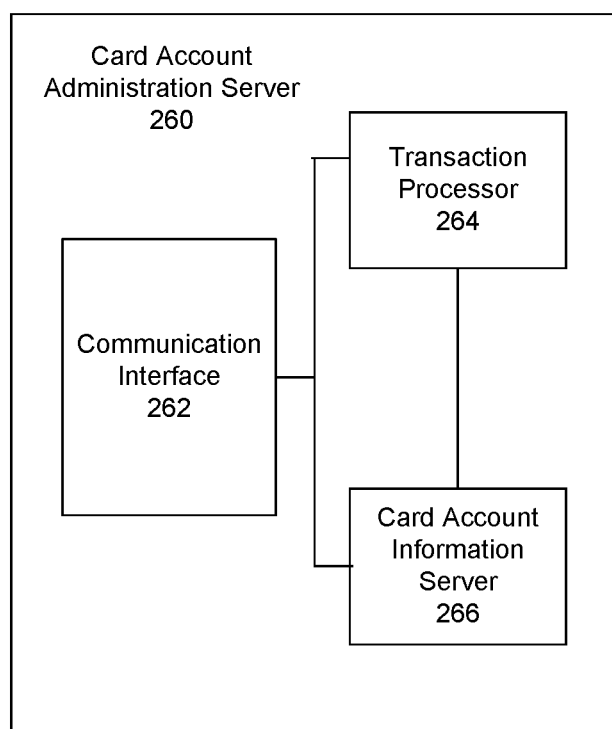
FIG. 8 is a schematic representation of card account administration server usable in embodiments of the invention.

The card account administration server 260 is a system of one or more network-enabled processing servers configured to monitor and/or process transactions involving the transaction card 220 and to process information requests relating to a card account associated with the transaction card 220. With reference to FIG. 8, the card account administration server 260 includes a transaction communication interface 262 that is connected to the network 230 for communication with the user device 210 and merchant devices.

The card account administration server 260 has a transaction processor 264 and a card account information server 266, both of which are configured for communication over the network 230 via the transaction communication interface 262. The card account information server 266 may be configured for maintaining a transaction card account database (not shown) in which is stored identification information for each of the plurality of transferable cards along with associated account information. Such account information may include identification, contact, and other information relating to the account holder.

The card account information server 266 may be further configured for assigning private and public personal encryption keys to an account of an account holder to whom a transaction card 220 has been issued or is to be issued. Once assigned, the card management server may transmit, via the network 230, the personal encryption keys to a user device 210 associated with the account holder. The card processing system may be further configured to receive a request from the user device 210, via the network 230 and the transaction communication interface 262, to activate the transaction card 220. The activation request includes a software signature encrypted by the user device 210 using the public and private personal encryption keys and a hardware signature encrypted by of the card's microprocessor chip 221 using the public and private card encryption keys stored therein. The card account information server 266 is further configured to, upon receiving the activation request, decrypt the software and hardware signatures to verify their association with the account, and, upon positive verification, activate the transaction card 220 by associating one or more authorized account functions with the transaction card 220. The server 266 may then store information reflecting the activation in the card database. An authorized account function could be any typical transaction card functionality such as, for example, interaction with a merchant transaction processing device to carry out a purchase transaction or use in an automatic teller machine. In particular embodiments, the authorized account functions may include the use of the transaction card 220 to initiate service and/or create a service account associated with the smart apparatus 290.

The card account information server 266 may also be configured to receive account information requests from a merchant or service account administrator to whom the transaction card 220 has been presented. In particular, the server 266 may be configured to receive an account information request from the service account management processor 256. The request may include NFC information transmitted by the transaction card 220 and read by the smart apparatus 290. In embodiments where a portion of the NFC information is encrypted using keys stored on the transaction card, the server 266 may be configured to retrieve the encryption keys associated with the transaction card 220 and decrypt the encrypted information to authenticate the and verify the presence of the transaction card 220.

Figure 9:
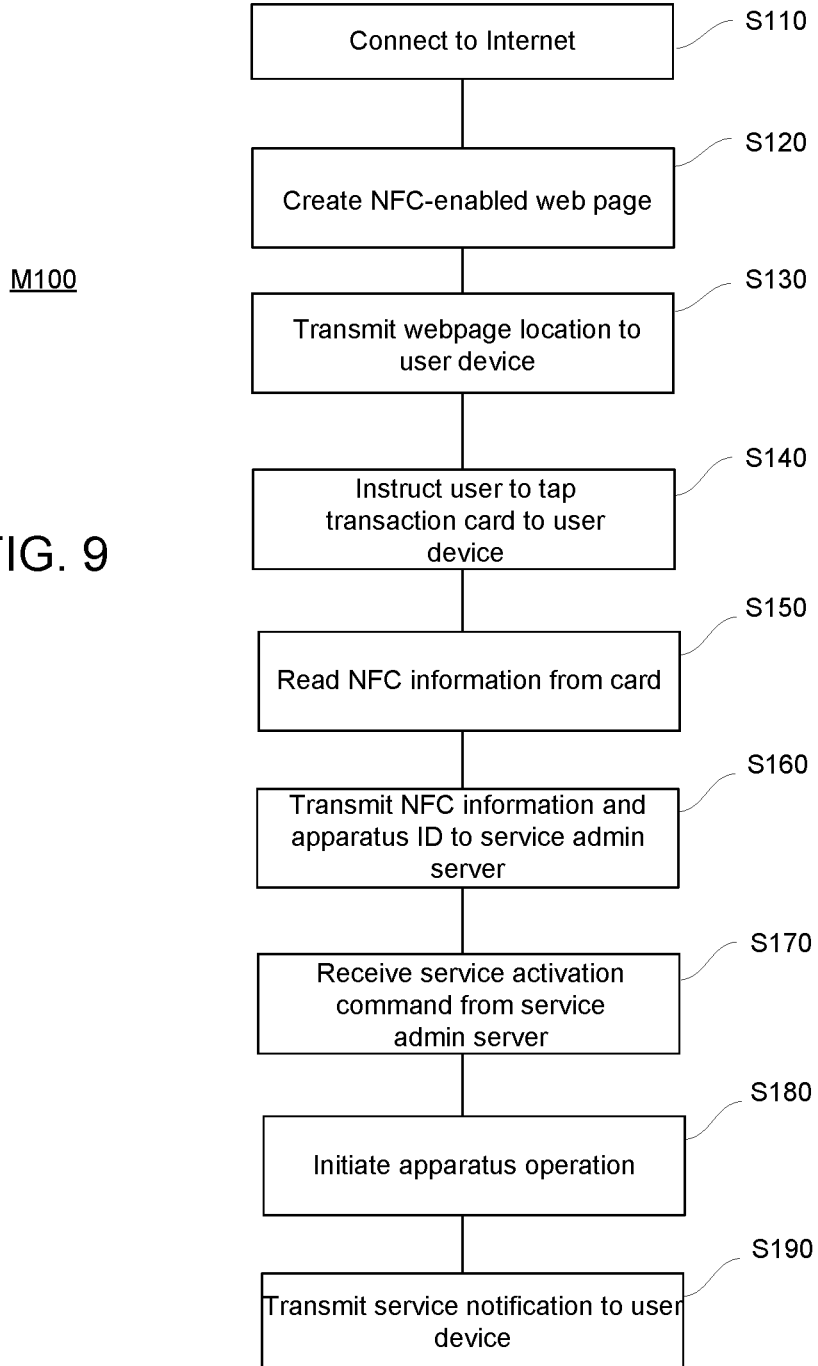
FIG. 9 is a flow chart of a method of activating a smart apparatus according to an embodiment of the invention.

FIG. 9 is a diagram of a method M100 of activating a network-enabled smart apparatus according to an embodiment of the invention. The method involves the use of an NFC-enabled user device and an NFC-enabled smart transaction card to activate the smart apparatus, which may be any appliance, vehicle or system having attributes similar to those of the generic apparatus 190 of FIG. 3. Some or all of the actions of method M100 may be carried out by the data processing system of the smart apparatus being activated. The method M100 includes, at S110, establishing an Internet connection by the apparatus data processing system. This may be carried out through a wired or wireless connection to an ISP or through a connection to a telecommunications network. In some embodiments, this action may be taken immediately upon the apparatus being powered up by the user for the first time. At S120, the data processing system of the smart apparatus creates a web page configured for use in conducting a Web NFC read of information from the transaction card. At S130, the apparatus data processing system transmits the webpage location to the user device. This may be accomplished via a connection of the smart apparatus to a local network. Alternatively, if so configured, the smart apparatus may transmit the information via a self-generated hotspot to which the user device has connected. In either case, the transmission may be in response to establishment of communication by the user device and upon receiving a request to initiate operation. In some embodiments, such communication between the user device and the apparatus may be established prior to the apparatus establishing the Internet connection. In such embodiments, the establishment of the Internet connection may be triggered by the establishment of communication with the user device or the receipt of an initiation request.

At S140, the apparatus data processing system transmits an instruction to the user device to tap the transaction card to the user device. This instruction may be presented via the web page or by a separate transmission via the local network or apparatus-generated hotspot. Upon the user tapping the transaction card to the user device, the apparatus data processing system reads, via Web NFC code, NFC information transmitted to the user device by the transaction card at S150. The NFC information includes, at least, sufficient information to identify the transaction card administrator and information usable by the transaction card administrator to identify the card and its associated transaction account. At S160, the apparatus data processing system transmits an activation request to the service administration server via the apparatus's network connection. The activation request may include a unique identifier for the apparatus and some or all of the NFC information read from the transaction card. At S170, the apparatus data processing system receives a service activation command from the service administration server. This command may include an instruction to initiate operation and/or initial operation and provisioning instructions. In some embodiments, the apparatus may also receive service account information. At S180, the apparatus initiates operation or, in some cases, established operational readiness. In the latter cases, the apparatus may require additional instruction or manipulation by the user before actually "turning on". In some embodiments, the apparatus may optionally send a service initiation notification to the user device at S190. This may be transmitted via the local network, the apparatus's self-generated hotspot, or through the wide area or other communications network.

Figure 10:
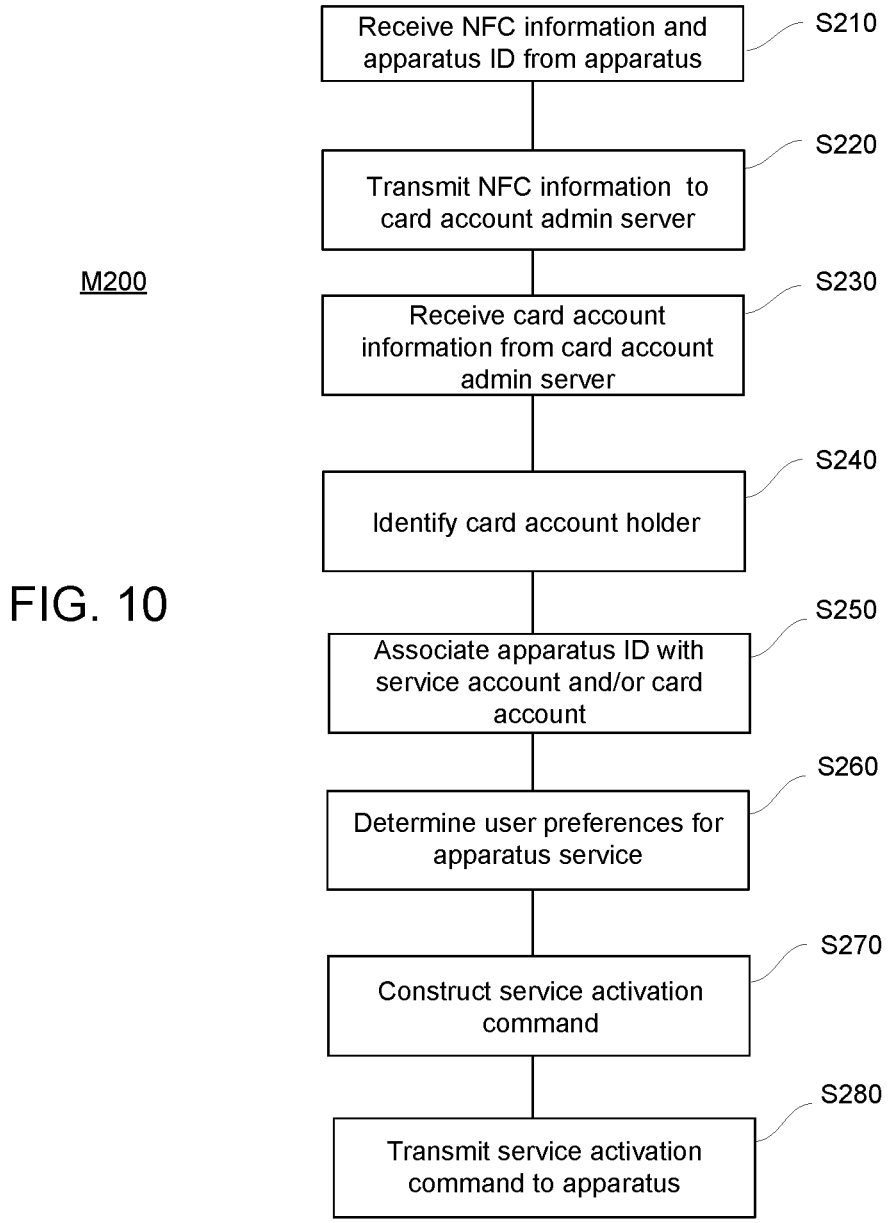
FIG. 10 is a flow chart of a method of activating a smart apparatus according to an embodiment of the invention.

FIG. 10 is a diagram of a method M200 of activating a network-enabled smart apparatus according to an embodiment of the invention. Some or all of the actions of method M200 may be carried out by an apparatus service administration server managed by an administrator having an association with the smart apparatus being activated or a service to be provided via the smart apparatus being activated. At S210 of the method M200, the administration server receives an activation request from the smart apparatus via a network. The activation request includes identification information unique to the smart apparatus. The request may also include NFC information read by the smart apparatus from a smart transaction card, the NFC information having been transmitted by the transaction card to a user device of a holder of a card account associated with the transaction card.

At S220, the service administration server uses the NFC information to identify a card account administrator associated with the transaction card transmits a card account information request to a card account administration server of that administrator. This request may include some or all of the NFC information, including card identification information, some or all of which may be encrypted. At S230, the service administration server receives card account information back from the card account administration server. This information may include identification, contact, and other information relating to the account holder/user. At S240, the server uses the account information to identify the account holder/user wishing to activate the smart apparatus. At S250, the server associates the apparatus identification information with a service account associated with the account holder. The account and apparatus ID information may be stored by the server in a service account information database. At S260, the service administration server may optionally determine user preferences for apparatus service or operating parameters. If the account holder already had an existing account, this may include importing previously established preferences for the account holder. Alternatively or in addition, the account holder may be contacted to provide or confirm the account holder's preferences. At S270, the server constructs a service activation command. This command may include an instruction to initiate operation and/or initial operation and provisioning instructions, which may be based on user preferences. In some embodiments, the command may also include service account and/or account holder information. At S280, the service administration server transmits the service activation command to the smart apparatus via the network.

FIG. 11 is a diagram of a method M300 of activating a network-enabled smart apparatus according to an embodiment of the invention. Some or all of the actions of method M300 may be carried out by an apparatus service administration server managed by an administrator having an association with the smart apparatus being activated or a service to be provided via the smart apparatus being activated. At S310 of the method M200, the administration server receives an activation request from the smart apparatus via a network. The activation request includes identification information unique to the smart apparatus. The request may also include NFC information read by the smart apparatus from a smart transaction card, the NFC information having been transmitted by the transaction card to a user device of a holder of a card account associated with the transaction card.

At S320, the service administration server uses the NFC information to identify a card account administrator associated with the transaction card and, at S330, transmits a card account information request to a card account administration server of that administrator. This request may include some or all of the NFC information, including card identification information, some or all of which may be encrypted. At S340, the service administration server receives card account information back from the card account administration server. This information may include identification, contact, and other information relating to the account holder/user. At S350, the server uses the account information to identify the card account holder wishing to activate the smart apparatus and determines whether that card account holder has a service account with the service administrator. This may include comparing the card account information with account information stored in a service account information database. If the user has an account, the processor sets the current service account to be the existing account at S351. If the user does not have an existing account, the server may create a new service account at S352 using the card account information. In some embodiments, the service administration server may contact the card account holder (e.g., via a transmission to the account holder's user device over the network) to verify that the user wishes to open a new service account or to obtain user preferences in establishing the account and/or operational parameters of the smart apparatus. After opening the new account, the service administration server may then set the current account to be the new service account at S354. At S360, the server may associate the smart apparatus with the existing or new account as appropriate and store the service account information in the account information database.

At S370, the service administration server may optionally determine user preferences for apparatus service or operating parameters. If the account holder already had an existing account, this may include importing previously established preferences for the account holder. Alternatively or in addition, the account holder may be contacted to provide or confirm the account holder's preferences. At S380, the server constructs a service activation command. This command may include an instruction to initiate operation and/or initial operation and provisioning instructions, which may be based on user preferences. In some embodiments, the command may also include service account and/or account holder information. At S390, the service administration server transmits the service activation command to the smart apparatus via the network.

The present invention provides a significant improvement in the security and efficiency of systems initiating operation of smart appliances, vehicles, and other apparatus by eliminating the need to download a specialized application to a user device. The method also enhances security by providing direct pass-through of transaction card identification information without interpretation or decryption by the user device being used to activate the apparatus.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. A network-enabled apparatus comprising:
   an apparatus data processing system;
   at least one operational system in communication with the apparatus data processing system;
   a first network communication interface configured for establishing communication over a wide area network;
   a second network communication interface configured for establishing communication over a local network; and
   a memory having stored therein apparatus identification information, at least one service application comprising instructions for the apparatus data processing system to implement a service operation using the at least one operational system, and an activation application comprising instructions for the apparatus data processing system to
   establish an internet connection via the first network communication interface,
   create a near field communication (NFC)-enabled web page,
   transmit, to a user device via the second communication interface, navigation information for accessing the NFC-enabled web page,
   read, via the NFC-enabled web page, NFC information transmitted to the user device by the smart transaction card, the NFC information including card identification information unique to the smart transaction card,
   transmit the NFC information and the apparatus identification information to a service administration server,
   receive, from the service administration server, a service activation command, and
   responsive to the service activation command, activate at least one of the at least one service application.

2. A network-enabled apparatus according to claim 1 wherein
   the second network communication interface comprises a wireless access point module configured for operation as a wireless local area network communication node,
   the activation application further comprises instructions for the apparatus data processing system to activate the wireless local area network communication node, and
   a service initiation communication is received from the user device via the wireless local area network node.

3. A network-enabled apparatus according to claim 1 wherein the activation application further comprises instructions for the apparatus data processing system to establish a connection to a local area network, and a service initiation communication is received from the user device via the local area network.

4. A network-enabled apparatus according to claim 1 wherein the service administrator is an internet service provider and the apparatus comprises a network router.

5. A network-enabled apparatus according to claim 1 wherein the apparatus is or includes a household appliance.

6. A network-enabled apparatus according to claim 1 wherein the apparatus is or includes an electrical distribution system.

7. A network-enabled apparatus according to claim 1 wherein the apparatus is or includes a household environmental control system.

8. A method for activating a network-enabled apparatus using a near field communication (NFC)-enabled user device and an NFC-enabled smart transaction card associated with a card account, the method comprising:

establishing an internet connection by the network-enabled apparatus;

creating an NFC-enabled web page by the network-enabled apparatus;

transmitting, by the network-enabled apparatus to the user device, an instruction to navigate to the NFC-enabled web page;

transmitting, by the network-enabled apparatus to the user device via the NFC-enabled web page, an instruction for the user to tap the smart transaction card to the user device;

reading, by the network-enabled apparatus via the NFC-enabled web page, NFC information transmitted to the user device by the smart transaction card, the NFC information including card identification information unique to the smart transaction card;

transmitting, by the network-enabled apparatus to a service administration server of a service administrator, the NFC information and apparatus identification information; and receiving, by the network-enabled apparatus from the service administration server, a service activation command.

9. A method according to claim 8 further comprising:

establishing a connection between the network-enabled apparatus and a wide area network; and activating, by the network-enabled apparatus, a wireless local area network node for communication with the user device, wherein a service initiation communication is received from the user device via the wireless local area network node, and wherein the internet connection is established via the wide area network.

10. A method according to claim 3 further comprising:

receiving a service initiation communication by the network-enabled apparatus from the user device.

11. A method according to claim 8 wherein at least a portion of the NFC information is encrypted information.

12. A method according to claim 11 wherein the encrypted information was encrypted by the smart transaction card and includes information unique to the NFC transmission by the transaction card to the user device.

13. A method according to claim 8 wherein the card account information includes identification of a card account holder associated with the smart transaction card.

14. A method according to claim 8 wherein the service activation command is received only upon authentication of the smart transaction card by the card administration server.

15. A method according to claim 8 wherein the service activation command includes account information for an apparatus service account.

16. A method according to claim 8 further comprising:

establishing a connection between the network-enabled apparatus and a wide area network; and establishing a connection between the network-enabled apparatus and a local area network, wherein a service initiation communication is received from the user device via the local area network, and wherein the internet connection is established via the wide area network.

17. A method for activating a network-enabled apparatus using a near field communication (NFC)-enabled user device and an NFC-enabled smart transaction card associated with a card account, the method comprising:

establishing communication between the network-enabled apparatus and the user device;

creating an NFC-enabled web page by the network-enabled apparatus;

establishing NFC communication between the smart transaction card and the user device in response to navigation to the NFC-enabled webpage by a web browser on the user device reading, by the network-enabled apparatus via the NFC-enabled web page, NFC information transmitted to the user device by the smart transaction card, the NFC information including card identification information unique to the smart transaction card;

transmitting, by the network-enabled apparatus to a service administration server, the NFC information and apparatus identification information; and receiving, by the network-enabled apparatus from the service administration server, a service activation command.

18. A method according to claim 17 wherein at least a portion of the NFC information is encrypted information.

19. A method according to claim 18 wherein the encrypted information was encrypted by the smart transaction card and includes information unique to the NFC transmission to the user device.

20. A method according to claim 17 wherein the activation command is received only upon authentication of the smart transaction card by the card administration server.

* * * * *